(12) United States Patent
Marshall

(10) Patent No.: US 7,326,918 B2
(45) Date of Patent: Feb. 5, 2008

(54) OPTICAL POSITION SENSOR ARCHITECTURE FOR SERVO SYSTEMS

(75) Inventor: Stephen Wesley Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 196 days.

(21) Appl. No.: 11/174,920

(22) Filed: Jul. 5, 2005

(65) Prior Publication Data

US 2007/0007427 A1    Jan. 11, 2007

(51) Int. Cl.
G01D 5/34 (2006.01)
G02B 26/02 (2006.01)

(52) U.S. Cl. ............ 250/231.13; 250/216; 250/232; 359/290

(58) Field of Classification Search ............ 250/231.13–231.18, 232, 233, 216, 201.1; 359/237, 290–292
See application file for complete search history.

(56) References Cited

U.S. PATENT DOCUMENTS 6,563,636 B1 * 5/2003 Baun et al. ............ 359/429
2004/0061678 A1 * 4/2004 Goh et al. ............ 345/156

* cited by examiner

Primary Examiner—Kevin Pyo
(74) Attorney, Agent, or Firm—Wade James Brady, III; Frederick J. Telecky, Jr.

(57) ABSTRACT

System and method for an optical position sensor architecture for use in servo systems. A preferred embodiment comprises a light source configured to produce a light with an intensity dependent upon a control signal, a first light sensor and a second light sensor positioned adjacent to one another, each light sensor configured to produce a current based upon an amount of light incident upon each light sensor. The preferred embodiment also comprises a slotted device coupled to the load and positioned between the light source and the first light sensor and the second light sensor. The slotted device regulates an amount of light striking the first light sensor and the second light sensor based upon a position of the load. The slotted device features a slot that has a radius with a linearly increasing radius as a function of rotation angle so that the optical position sensor has linear behavior.

16 Claims, 4 Drawing Sheets

OPTICAL POSITION SENSOR ARCHITECTURE FOR SERVO SYSTEMS

TECHNICAL FIELD

The present invention relates generally to a system and method for electrically controlled devices, and more particularly to a system and method for an optical position sensor architecture for use in servo systems.

BACKGROUND

A servo system requires feedback information in order to close the servo loop. A servo command to the servo system to move or rotate a load to a new position will typically require the servo to generate a signal (an error signal) that is representative of an error between a present position of the load and the new commanded position. The error signal can then be used as a basis to move the load with an actuator to the new position. As the load approaches the new position, the error signal will tend to represent a smaller error value, indicating that the load is coming nearer to the new position.

A position sensor can be used to translate information related to the position of the load and/or the actuator into electrical information that can be provided to the servo system. The electrical information (i.e., the error signal) can be used in the servo system to make necessary adjustments to the servo commands used to control the actuator. It is desired that the position sensor have a linear response so that there can be optimum performance throughout the full range of motion of the servo.

A wide variety of sensor types has been used in the past as position sensors. Potentiometers have been used as position sensors in servo systems. The potentiometer uses electrical contacts to provide a voltage that can vary depending upon servo position and has a linear response. Furthermore, potentiometers can be inexpensive, permitting the construction of low-cost servo systems. Electromagnetic sensors, such as those using Hall Effect sensors, have been used as position sensors in servo systems. The electromagnetic position sensors have an advantage in that there are few mechanical parts to wear. Furthermore, since there is no friction involved in the position sensing, the precision of the position sensor is high. Optical sensors with single photo-sensors have also been used in servo systems. The optical position sensors have an advantage of few mechanical parts, no friction, long life, and so forth, as well as having consistent, predictable performance over a large number of position sensors.

One disadvantage of the prior art is that potentiometers make use of a mechanical mechanism to translate the positional information into electrical information. A mechanical mechanism will have friction since physical contact is required, which can lead to erratic performance, especially when the servo is starting or stopping. Furthermore, mechanical mechanisms can wear down with use; therefore, they can have a limited useful lifespan.

A second disadvantage of the prior art is that the electromagnetic sensors making use of Hall Effect sensors can have unpredictable performance across different position sensors and can require tweaking to provide consistent and predictable performance. The additional tweaking can increase the cost involved in the use of the electromagnetic sensors.

A third disadvantage of the prior art is that the optical sensors with single photo-sensors have had non-linear response. Therefore, the performance of the servo system can be sub-optimal throughout the full range of motion of the servo.

SUMMARY OF THE INVENTION

These and other problems are generally solved or circumvented, and technical advantages are generally achieved, by preferred embodiments of the present invention which provides for a system and method for an optical position sensor architecture for use in servo systems.

In accordance with a preferred embodiment of the present invention, an optical position sensor for a servo moving a load is provided. The optical position sensor includes a light source configured to produce a light with an intensity dependent upon a control signal, a first light sensor and a second light sensor positioned adjacent to one another, and a slotted device coupled to the load and positioned between the light source and the first light sensor and the second light sensor. With each light sensor producing a current based upon an amount of light incident upon a detector in each light sensor, and the slotted device regulates an amount of light produced by the light source that strikes the first light sensor and the second light sensor based upon a position of the load.

In accordance with another preferred embodiment of the present invention, a method for generating a feedback control signal for an optical servo system is provided. The method includes computing the feedback control signal from a difference of a first current produced by a first optical sensor and a second current produced by a second optical sensor, and computing a light modulation signal for a light source illuminating the first optical sensor and the second optical sensor. Wherein the modulation of the light source results in an automatic normalization of the feedback control signal.

In accordance with another preferred embodiment of the present invention, a display system for displaying images is provided. The display system includes an array of light modulators configured to create images made up of pixels by setting each light modulator in the array of light modulators to a state matching a corresponding pixel, and a light source to illuminate the array of light modulators, wherein a light from the light source reflecting off the array of light modulators forms the images on a display. The display system also includes an aperture positioned between the light source and the array of light modulators, the aperture configured to modulate the light produced by the light source, and a servo system coupled to the aperture, the servo system configured to move the aperture into position to modulate the light by a desired amount.

An advantage of a preferred embodiment of the present invention is that the optical position sensor architecture provides the benefits of optical sensors (low-cost, long-life, and no performance degradation due to friction losses) as well as a linear response throughout the full range of motion of the servo.

A further advantage of a preferred embodiment of the present invention is that the use of multiple photo-sensors and differential operation can provide a more stable operation across a wide range of conditions.

Yet another advantage of a preferred embodiment of the present invention is that the closed-loop method used for normalization eliminates the need for an analog divider circuit. The elimination of the analog divider circuit can increase reliability as well as decrease cost of the servo system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a servo system used to control an aperture in a digital display system, wherein the digital display system is a spatial light modulator that uses movable micromirrors to modulate light, such as a digital light processor (DLP™). The invention may also be applied, however, to other applications wherein a servo system is needed to move a load from one position to another. Examples of such systems include other types of spatial light modulators based display systems, such as those making use of deformable mirrors to modulate light, manufacturing, robotics, toys, consumer electronics, and so forth.

Figure 1:
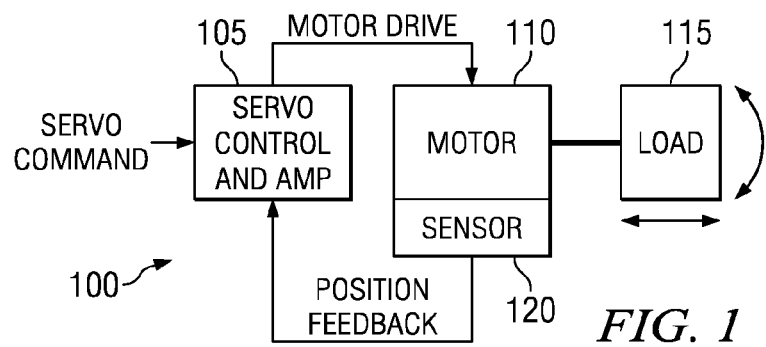
FIG. 1 is a diagram of an exemplary servo system.

With reference now to FIG. 1, there is shown a diagram illustrating an exemplary servo system 100. The servo system 100 includes a servo control and amplifier unit 105 that receives servo commands and translates the servo commands into electrical signals that can drive a motor 110. The motor 110 provides movement to a load 115. The movement of the load 115 can be detected by a sensor 120, which provides position feedback information to the servo control and amplifier unit 105. Based upon the position feedback information, the servo control and amplifier unit 105 can make necessary changes to the electrical signals that it is providing to the motor 110 to move the load 115 to a desired position. The sensor 120 can make use of a variety of techniques including mechanical contact (potentiometers), electromagnetic (Hall Effect sensors), optics (photosensors), and so forth to translate the movement of the load 115 into position feedback information.

Figure 2:
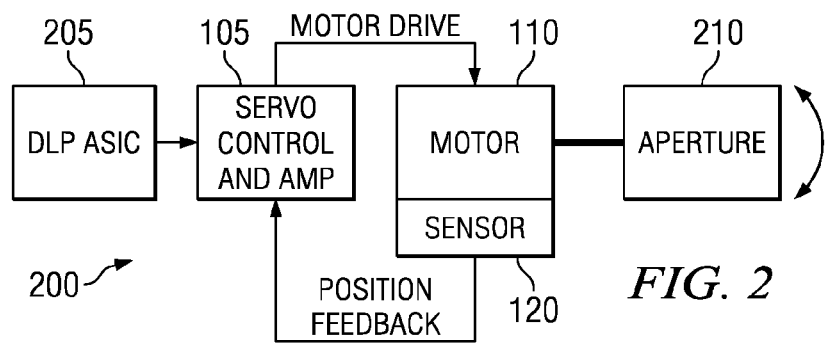
FIG. 2 is a diagram of a servo system used to control an aperture in a digital display system, according to a preferred embodiment of the present invention.

With reference now to FIG. 2, there is shown a diagram illustrating a servo system 200 used to control an aperture in a digital display system, according to a preferred embodiment of the present invention. In a digital display system, such as a binary spatial light modulator (SLM) display system, wherein light is modulated by light modulators, such as movable micromirrors, to display images and moving video on a display, there is a desire to enhance image quality by increasing a bit-depth of the display. The bit-depth of the display system can be defined as a log base two (2) of a maximum amount of light provided by the display system divided by a minimum amount of light provided by the display system. The greater the bit-depth, the more image detail that can be displayed by the display system.

A technique that can be used to increase the bit-depth of the display system involves the movement of an aperture to impinge upon a light (not shown) that is being used to display the images. The size of the aperture can determine the amount of light that is being displayed. Therefore, a small aperture can result in a small amount of light being displayed while a large aperture can result in a large amount of light being displayed.

The servo system 200 used to move the aperture 210 through the light can include the servo control and amplifier unit 105 to provide instructions to the motor 110 to physically move an aperture 210. The servo control and amplifier unit 105 can receive commands from a controller 205, such as an application specific integrated circuit (ASIC) that is designed to control the operation of a binary spatial light modulator display system using movable micromirrors. In addition to being an ASIC, the controller 205 can be a general purpose processor, a digital signal processor (DSP), an embedded controller, and so forth.

As displayed in FIG. 2, the aperture 210 is shown as being moved in a radial fashion. However, alternate embodiments of the present invention can have the aperture 210 moving in a linear fashion. The sensor 120 can translate movements of the aperture 210 into position feedback information that can be provided to the servo control and amplifier unit 105.

Figure 3A:
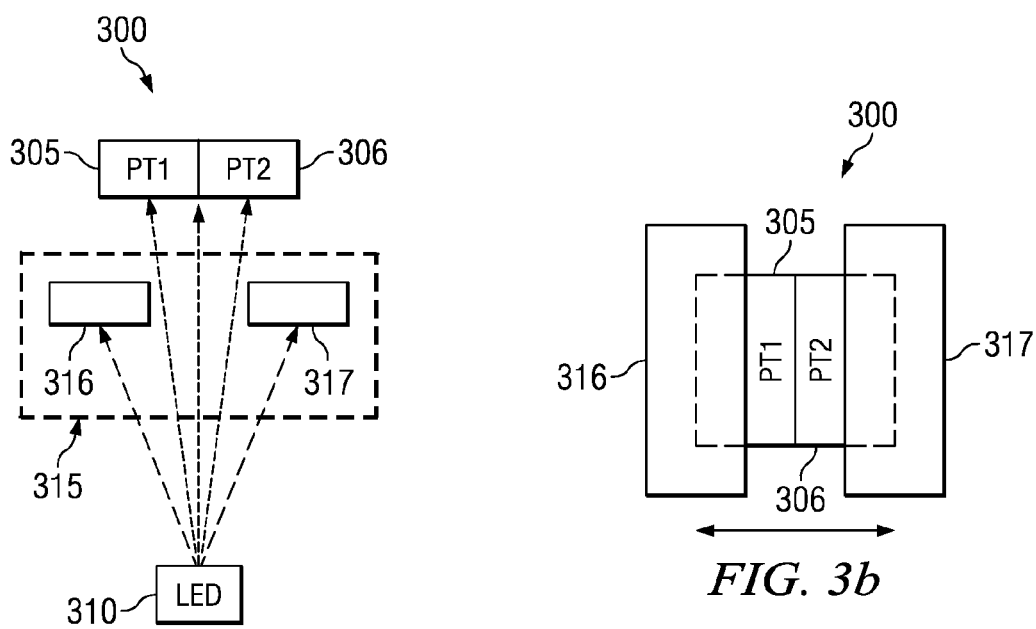
FIGS. 3a and 3b are diagrams of an optical position sensor for use in translating positional information into electrical information, according to a preferred embodiment of the present invention.
Figure 3B:
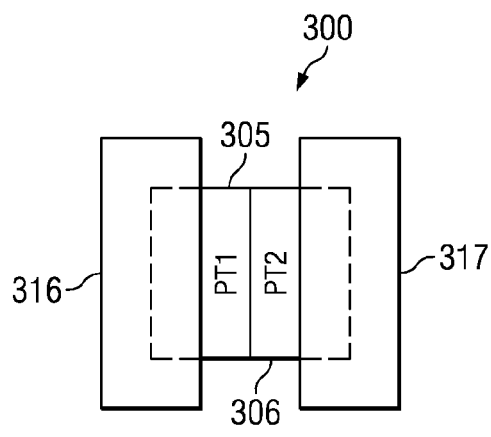

With reference now to FIGS. 3a and 3b, there are shown diagrams illustrating an optical position sensor 300 for use in translating positional information into electrical information, according to a preferred embodiment of the present invention. The diagram shown in FIG. 3a, illustrates a top view of the optical position sensor 300, which can be used as an implementation of the sensor 120 (FIG. 2), and comprises a pair of phototransistors, PT1 305 and PT2 306.

The phototransistors, PT1 305 and PT2 306, can be arranged in a side-by-side configuration and may include infrared filters (not shown) to prevent stray visible light from affecting position sensing accuracy. The phototransistors, PT1 305 and PT2 306, can be illuminated by a light emitting diode (LED) 310. The LED 310 should have an emission wavelength that matches the response of the phototransistor, PT1 305 and PT2 306.

A slotted device 315 may be positioned between the phototransistors, PT1 305 and PT2 306, and the LED 310 to control the amount of light received at the phototransistors, PT1 305 and PT2 306. According to a preferred embodiment of the present invention, the slotted device 315 comprises a piece of material, preferably flat, with a slot cut into the piece. The diagram shown in FIG. 3a illustrates a top cross-sectional view of the slotted device 315. Visible are two portions, a first portion 316 on a first side of the slot and a second portion 317 on a second side of the slot. Light from the LED 310 striking the phototransistors, PT1 305 and PT2 306, can produce a current in each phototransistor with the magnitude of the current being proportional to the amount of light on the phototransistors, PT1 305 and PT2 306.

The diagram shown in FIG. 3b illustrates a front view of the optical position sensor 300, such as from a vantage point of the LED 310. Shown are the phototransistors, PT1 305 and PT2 306, and the first portion 316 and the second portion 317 of the slotted device 315. The slotted device 315 shown in FIG. 3b may only be a small portion of the entire slotted 315. As the aperture 210 moves, the slotted device 315 also moves. As the slotted device moves 315, the slot translates across the front of the phototransistors, PT1 305 and PT2 306, and permits light from the LED 310 to strike the phototransistors, PT1 305 and PT2 306, in different proportions. For example, with the slot of the slotted device 315 positioned as shown in FIG. 3b, light from the LED 310 will strike the phototransistors, PT1 305 and PT2 306, in relatively equal proportions. If the slotted device 315 moves so that the slot moves towards the left, more light from the LED 310 will strike phototransistor PT1 305 than phototransistor PT2 306.

Figure 4A:
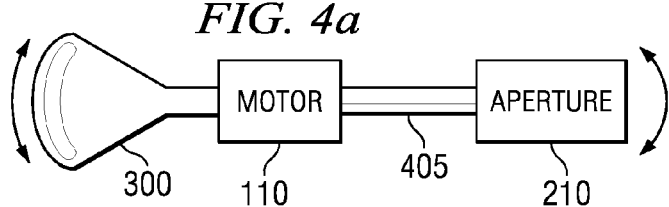
FIGS. 4a and 4b are diagrams of the slotted device in the optical position sensor, according to a preferred embodiment of the present invention.
Figure 4B:
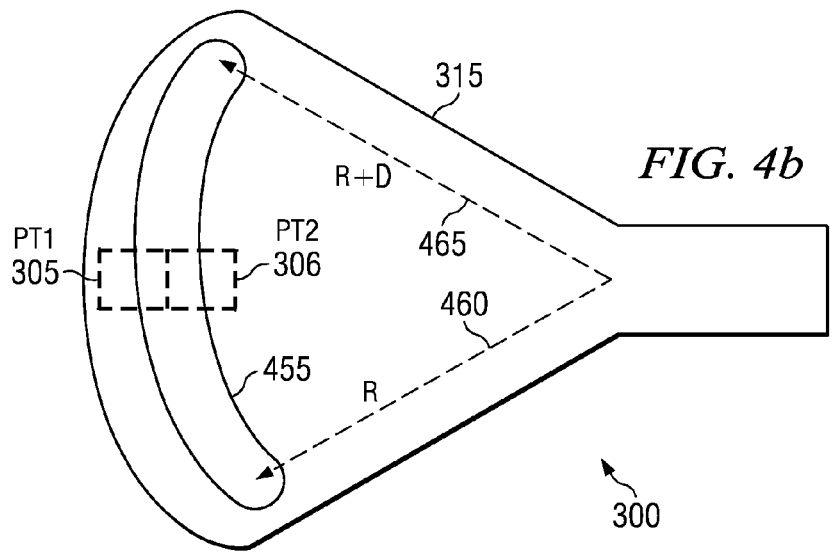

With reference now to FIGS. 4a and 4b, there are shown diagrams illustrating the slotted device 315, according to a preferred embodiment of the present invention. The diagram shown in FIG. 4a illustrates a detailed view of the motor 110, aperture 210, and optical position sensor 300 of the servo system 200. The aperture 210 is moved by the motor 110 either radially or linearly (radial movement is shown in FIG. 4a). According to a preferred embodiment of the present invention, the optical position sensor 300 features a slot cut in the form of an arc can directly convert a rotation of a motor armature 405 into translational motion of the slot image across the phototransistors, PT1 305 and PT2 306, to generate electrical information. Since the optical position sensor 300 moves radially, if the aperture 210 is moved linearly by the motor 110, a movement transformation must take place so that the optical position sensor 300 can accurately translate the movement of the aperture 210 into electrical information. In other embodiments, a simple toothed wheel (not shown) can be used to transform the linear movements of the armature 405 into rotational movements of the optical position sensor 300.

The diagram shown in FIG. 4b illustrates a detailed view of the optical position sensor 300. There is shown the phototransistors, PT1 305 and PT2 306, as dashed lines indicating their position behind the slotted device 315. The slotted device 315 is shown as having a wedge shaped, but other shapes are possible, such as a flat arced strip. The slotted device 315 can be made from an opaque material that blocks light produced by the LED 310 (not shown in FIG. 4b) and has a slot 455 that is cut through the slotted device 315, wherein light produced by the LED 310 can pass through the slot 455 unimpeded. The slot 455 can have a continually changing radius, for example, at a starting point of the slot 455, the slot 455 may have a radius 460 of R, while at an ending point of the slot 455, the slot 455 may have a radius 465 of R+Δ. According to a preferred embodiment of the present invention, the radius of the slot 455 changes linearly with angle of rotation. Therefore, the slot 455 translates linearly across the phototransistors, PT1 305 and PT2 306, as the slotted device 315 rotates. The shape of the slot 455 is known as an Archimedes spiral. Archimedes spirals are considered well known by those of ordinary skill in the art of the present invention and will not be discussed herein.

Figure 5A:
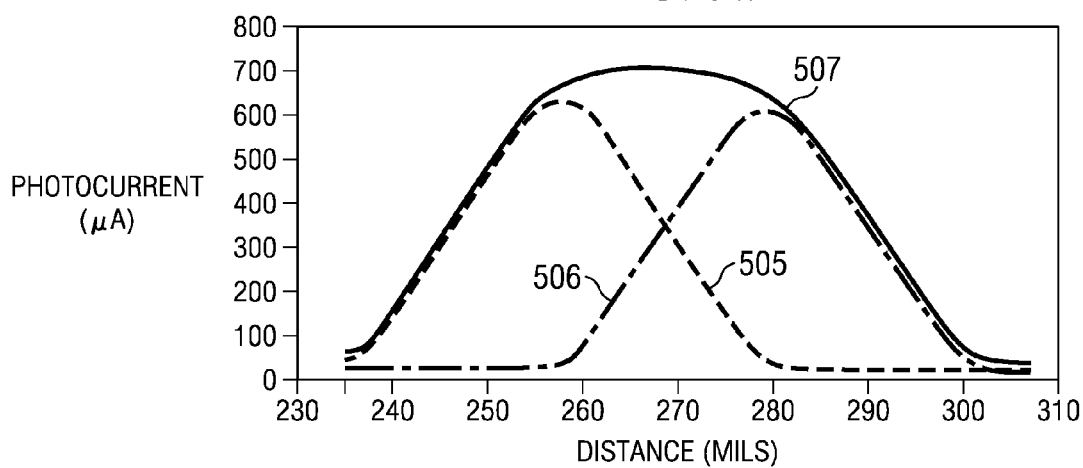
FIGS. 5a through 5d are data plots of currents produced by phototransistors in the optical position sensor, according to a preferred embodiment of the present invention.

With reference now to FIGS. 5a through 5d, there are shown data plots illustrating currents produced by the phototransistors, PT1 305 and PT2 306, according to a preferred embodiment of the present invention. The data plot shown in FIG. 5a illustrates currents produced by the phototransistors, PT1 305 and PT2 306, as the slotted device 315 rotates, moving the slot 455 across the phototransistors, PT1 305 and PT2 306. In this embodiment, the width of the slot 455 is substantially equal to the center-to-center spacing of the phototransistors PT1 305 and PT2 306. However, this should not be construed as being limiting to the spirit or scope of the present invention. Initially, all of the slot 455 is over neither of the phototransistors. Then as the slotted device 315 continues to rotate, the slot 455 begins to move over one of the phototransistors, for example, phototransistor PT1 305, and not the other phototransistor PT2 306. As such, light from the LED 310 only strikes the surface of the phototransistor PT1 305 and only the phototransistor PT1 305 produces current.

As the slotted device 315 continues to rotate, the slot 455 translates across the phototransistors, PT1 305 and PT2 306, and eventually, begins to move over the phototransistor PT2 306. As the slot 455 moves over the phototransistor PT2 306 it also begins to move away from the phototransistor PT1 305. Therefore, the current produced by the phototransistor PT1 305 decreases while the current produced by the phototransistor PT2 306 increases. As the slotted device 315 reaches an end of its rotation, the slot 455 moves away from the phototransistor PT2 306 and the current produced by the phototransistor PT2 306 drops. A first curve 505 illustrates the current produced by phototransistor PT1 305 and a second curve 506 illustrates the current produced by the phototransistor PT2 306, while a third curve 507 illustrates a current that is a sum of the currents of both phototransistors, PT1 305 and PT2 306.

Figure 5B:
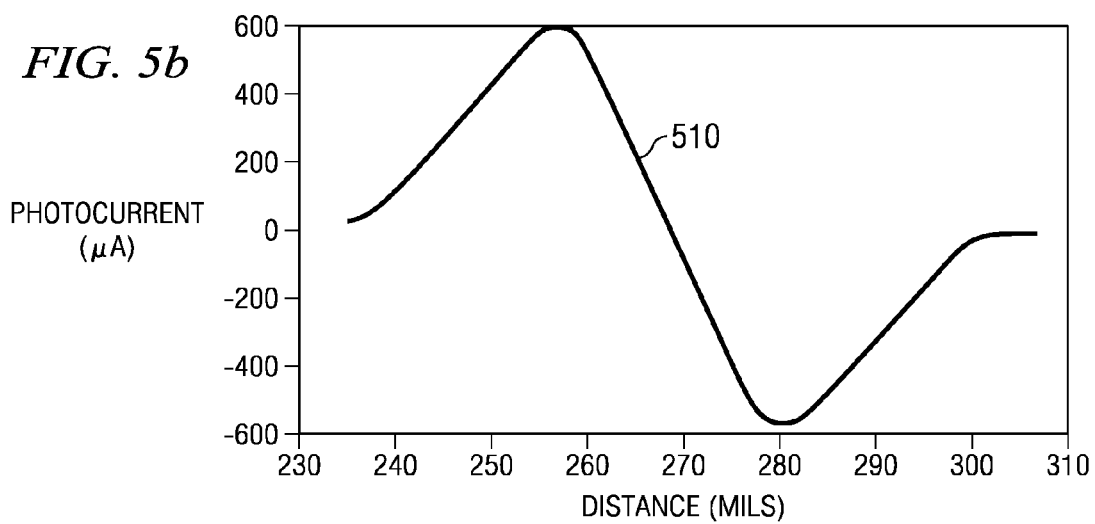
Figure 5C:
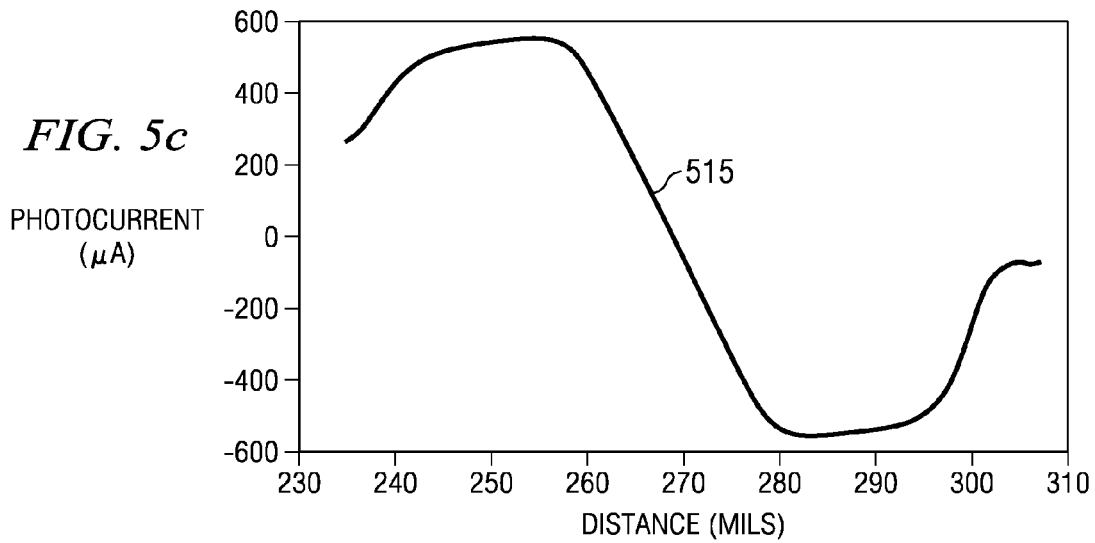
Figure 5D:
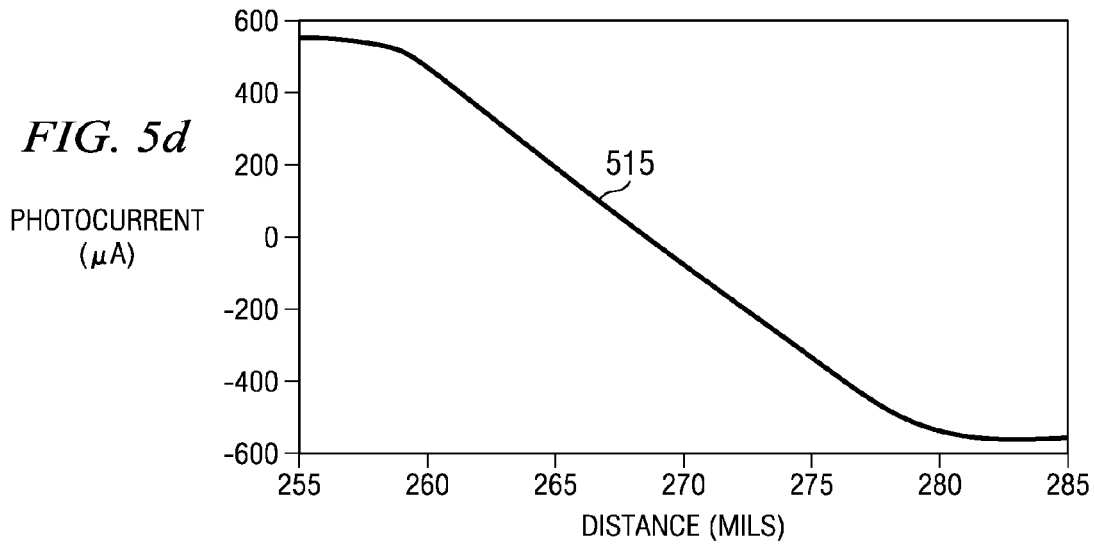

The data plot shown in FIG. 5b illustrates a fourth curve 510 showing a difference of the currents produced by the phototransistors, PT1 305 and PT2 306. The fourth curve 510 shows a range of motion of the slot 455 that displays linear behavior. Normally, to provide a constant result that is independent of the amplitude of the light produced by the LED 310, i.e., the brightness of the LED 310, the difference of the currents (the fourth curve 510 (FIG. 5b)) can be normalized (divided) by a sum of the currents produced by the phototransistors, PT1 305 and PT2 306 (the third curve 507 (FIG. 5a)). This is illustrated in the data plot shown in FIG. 5c as a fifth curve 515. Finally, the data plot shown in FIG. 5d illustrates an expanded portion of the fifth curve 515, showing the linear portion of the portion of the normalized difference curve.

Figure 6:
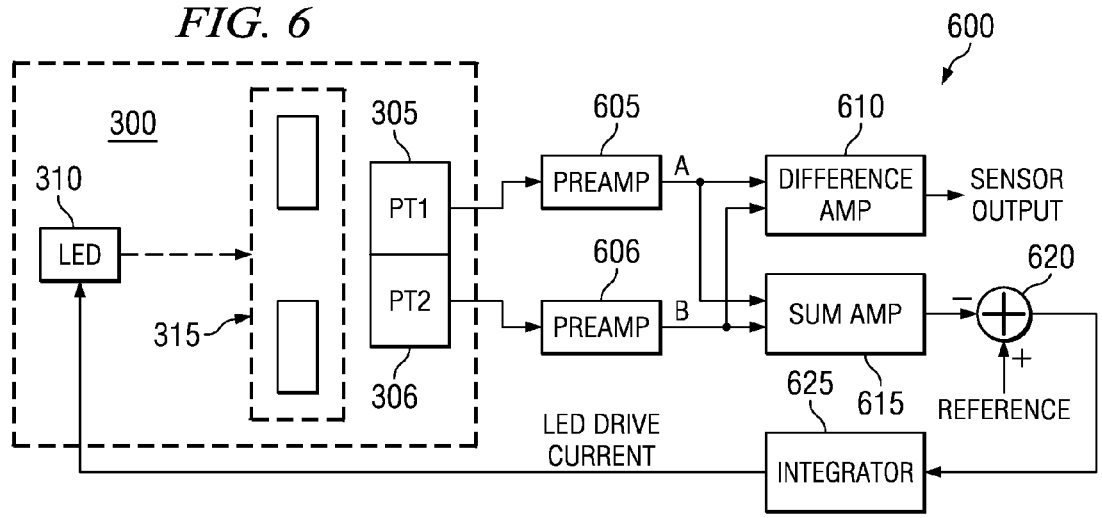
FIG. 6 is a diagram of a position sensor system for producing a position feedback signal, according to a preferred embodiment of the present invention.

With reference now to FIG. 6, there is shown a diagram illustrating a position sensor system 600 for producing a position feedback signal, according to a preferred embodiment of the present invention. The position sensor system 600 can be located in the sensor 120 (FIG. 2) to translate position information into electrical information that can be fedback to the servo control and amplifier unit 105 (FIG. 2) to allow for accurate control of the position of the aperture 210 (or in general, the load 115).

The position sensor system 600 comprises the optical position sensor 300 coupled to circuitry used to convert currents produced by the optical position sensor 300 into the electrical information to be fedback to the servo control and amplifier unit 105. As discussed the description of FIGS. 3a and 3b, the optical position sensor 300 comprises phototransistors, PT1 305 and PT2 306, that can produce a photo current that is proportional to the magnitude of light that strikes their reactive surfaces. The light is provided by the LED 310 and a slotted device 315 can block the light produced by the LED 310 or pass the light produced by the LED 310. The slotted device 315 can move in conjunction with the movement of the aperture 210. Therefore, the magnitudes of the currents produced by the phototransistors, PT1 305 and PT2 306, are dependent upon the movement of the aperture 210.

An output from each of the phototransistors, PT1 305 and PT2 306, can be coupled to a preamplifier (preamp) to amplify a current produced by the phototransistors, PT1 305 and PT2 306, and generate a voltage level adequate for processing by subsequent circuitry. A first preamp 605 may be coupled to an output from the phototransistor PT1 305 while a second preamp 606 may be coupled to an output from the phototransistor PT2 306. Amplified voltage outputs from the first preamp 605 (labeled A) and the second preamp 606 (labeled B) can be provided to a difference amplifier 610 and a sum amplifier 615. The difference amplifier 610 is preferably a two-input amplifier that can compute a difference of two signals at its two inputs, producing an output that is substantially equal to A−B. The sum amplifier 615 (also preferably a two-input amplifier) can compute a sum of two signals at its two inputs, producing an output that is substantially equal to A+B.

The output of the difference amplifier 610 (A−B) can be fedback to the servo control and amplifier unit 105 and used to modify electrical signals provided to the motor 110 to move the aperture 210. Typically, the feedback signal (the output of the difference amplifier 610) needs to be normalized (divided) by the output of the sum amplifier 615 (A+B). However, the implementation of an analog divider can be difficult. Therefore, with additional processing of the output of the sum amplifier 615, it can be possible to eliminate the need for the analog divider.

According to a preferred embodiment of the present invention, it can be possible to eliminate the need for the analog divider by controlling the intensity of the light produced by the LED 310. The output of the sum amplifier 615 (A+B) can be processed and then used to control the amount of light (the intensity) produced by the LED 310 to drive the output of the sum amplifier 615 to a constant operating point. The output of the sum amplifier 615 can be provided to a subtractor 620, which subtracts the output of the sum amplifier 615 from a reference voltage (reference_voltage−(A+B)) producing an error signal. According to a preferred embodiment of the present invention, the reference voltage can be set to determine the desired operating point of the sum amplifier 615. Typically, the reference voltage would be set to half of a power supply voltage. An error signal output of the subtractor 620 can then be provided to an integrator 625, which as its name implies, computes an integral of the error signal output of the subtractor 620. The integrated error signal output of the integrator 625 can then be used to adjust the magnitude of the LED drive current until the output of the sum amplifier 615 is at the desired operating point and the error signal is driven to zero. If the integrated error signal output of the integrator 625 is large, then the LED 310 will light up brightly, while if it is small, then the LED 310 will be dim. The regulation of the light produced by the LED 310 results in the output of the sum amplifier 615 being substantially equal to a constant. This leads to an automatic normalization of the output of the difference amplifier 610.

Figure 7A:
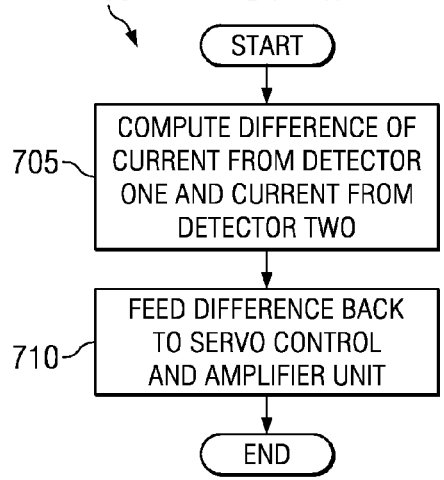
FIGS. 7a and 7b are diagrams of algorithms for computing the feedback signal for the servo control and amplifier unit and the LED drive current, according to a preferred embodiment of the present invention.
Figure 7B:
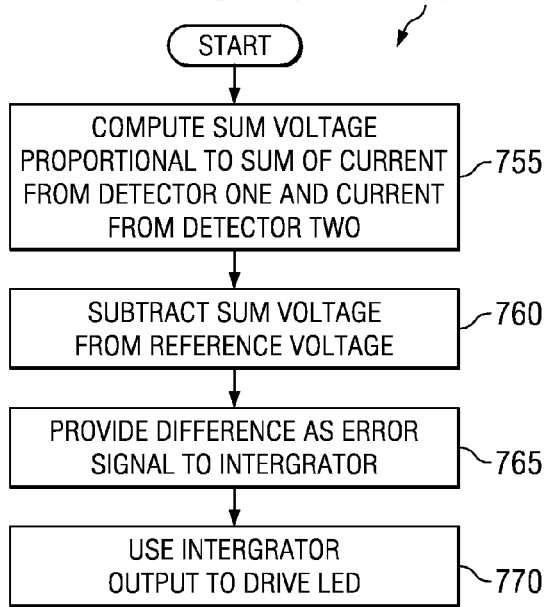

With reference now to FIGS. 7a and 7b, there are shown diagrams illustrating algorithms for computing the feedback signal for the servo control and amplifier unit 105 (FIG. 2) and the LED drive current, according to a preferred embodiment of the present invention. The algorithms shown in FIGS. 7a and 7b can be illustrative of the computations taking place in the position sensor system 600.

The diagram shown in FIG. 7a illustrates an algorithm 700 for use in computing the feedback signal for use by the servo control and amplifier unit 105. The algorithm 700 can be a representation of operations performed by circuitry or functional blocks in the position sensor system 600. Alternatively, the computation of the feedback signal can be performed in software by software functions implementing the circuitry or functional blocks of the position sensor system 600. The computation of the feedback signal can begin with the computation of a difference between a current provided by a first phototransistor, such as phototransistor PT1 305, and a current provided by a second phototransistor, such as phototransistor PT2 306 (block 705). If performed using circuitry or functional blocks, a difference amplifier, such as the difference amplifier 610 (FIG. 6), can be used to compute a voltage proportional to the difference of the two currents. Prior to the computation of the difference, the currents produced by the phototransistors may be converted to voltage levels and amplified to bring the magnitudes of the voltages to a level that is compatible with requirements of the difference amplifier 610 (and any remaining circuitry).

A voltage proportional to the difference of the two currents produced by the phototransistors can be provided back to the servo control and amplifier unit 105 as the feedback signal (block 710). Typically, the feedback signal would require normalization prior to being fedback to the servo control and amplifier unit 105. However, the use of LED light modulation based upon keeping a sum of the two photo currents equal to a constant value can allow for the elimination of the normalization. A discussion of the computation of the LED light modulation is provided below.

The diagram shown in FIG. 7b illustrates an algorithm 750 for modulating light output intensity of the LED 310 (FIG. 6) so that it is possible to eliminate the normalization of the output of the difference amplifier 610 (FIG. 6). The magnitude of the current produced by a phototransistor can be dependent upon several factors, such as the amount of light incident on the phototransistor and the intensity of the light. The amount of light incident on the phototransistor can be regulated by the position of the slotted device 315, for example, while the intensity of the light can be dependent upon a magnitude of a current being used to drive the LED 310. For example, as a magnitude of a current used to drive the LED 310 increases, the intensity of the light produced by the LED 310 will also increase.

The algorithm 750 can be a representation of operations performed by circuitry or functional blocks in the position sensor system 600. Alternatively, the control of the light produced by the LED 310 can be performed in software by software functions implementing the circuitry or functional blocks of the position sensor system 600. The control of the light produced by the LED 310 can be achieved by controlling the magnitude of the current used to drive the LED 310. The control of the magnitude of the current can begin with the computation of a sum of a current from a first phototransistor, such as phototransistor PT1 305, and a current from a second phototransistor, such as phototransistor PT2 306 (block 755). If performed using circuitry or functional blocks, a sum amplifier, such as the sum amplifier 615 (FIG. 6), can be used to compute a voltage proportional to the sum of the two currents. Prior to the computation of the sum, the currents produced by the phototransistors may be converted to voltages and amplified to bring the magnitudes of the voltages to a level that is compatible with requirements of the sum amplifier 615 (and any remaining circuitry).

After the computation of a sum voltage proportional to the sum of the currents from the phototransistors, PT1 305 and PT2 306, the sum voltage can be subtracted from a reference voltage (block 760). As discussed previously, the reference voltage can be set to determine the desired operating point of the sum amplifier 615. Typically, the reference voltage would be set to half of the power supply voltage. The difference of the reference voltage and the sum voltage from the sum amplifier 615 can then be provided as an error signal to an integrator, such as the integrator 625 (FIG. 6), where the error signal can be integrated (block 765) and then used to drive the LED 310 (block 770).

Figure 8:
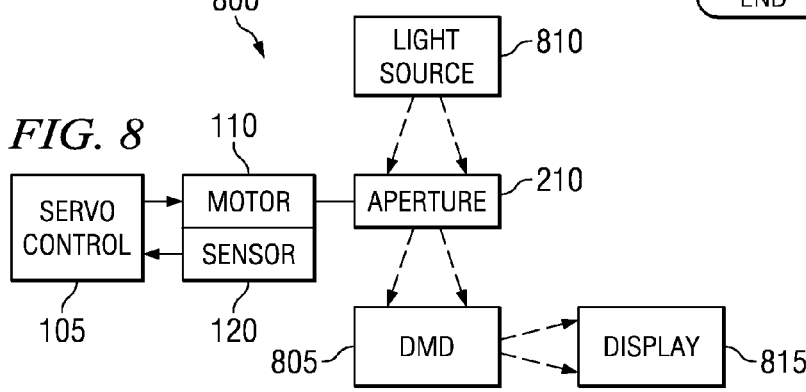
FIG. 8 is a diagram of a portion of a binary SLM display system using a servo controlled aperture to increase the bit-depth of images being displayed by the display, according to a preferred embodiment of the present invention.

With reference now to FIG. 8, there is shown a diagram illustrating a portion of a binary SLM display system 800 using a servo controlled aperture to increase the bit-depth of images being displayed by the display, according to a preferred embodiment of the present invention. As discussed previously, in the binary SLM display system 800, an array of light modulators, such as an array of movable micromirrors in a digital micromirror device (DMD) 805, is used to modulate light produced by a light source 810 so that light reflected from the DMD 805 can display a desired image on a display 815.

An aperture 210 can be moved in and out of position in between the light source 810 and the DMD 805 to change an amount of light from the light source 810 striking the DMD 805. By varying the amount of light striking the DMD 805, it is possible to vary the amount of light reflecting off the DMD 805 and displayed on the display 815. This can result in an increase in the bit-depth of the binary SLM display system 800. The aperture 210 can be moved by a motor 110 that is controlled by a servo control and amplifier unit 105 making use of feedback control signals provided by an optical position sensor 120. The aperture 210 position can be controlled by commands issued by a system controller (not shown) that can also be used to control light modulator states and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical position sensor for a servo moving a load comprising:
   a light source configured to produce a light with an intensity dependent upon a control signal;
   a first light sensor and a second light sensor positioned adjacent to one another, each light sensor configured to produce a current based upon an amount of light incident upon a light detector in each light sensor; and
   a slotted device coupled to the load and positioned between the light source and the first light sensor and the second light sensor, the slotted device configured to regulate an amount of light produced by the light source that strikes the first light sensor and the second light sensor based upon a position of the load,
   wherein the slotted device is configured to continuously expose a variable portion of the first and the second light sensors to the light from the light source.

2. The optical position sensor of claim 1, wherein the slotted device further regulates a position where light from the light source strikes the first light sensor and the second light sensor.

3. The optical position sensor of claim 2, wherein the slotted device regulates the light via a slot in the slotted device, wherein the slot has a radius that varies linearly with a rotation of the slotted device, and wherein as the load moves through a full range of motion, the position where the light from the light source strikes the first light sensor and the second light sensor pans across the first light sensor and the second light sensor.

4. The optical position sensor of claim 3, wherein a width of the slot in the slotted device remains constant for an entire length of the slot.

5. The optical position sensor of claim 4, wherein the width of the slot is substantially equal to a center-to-center spacing of the first light sensor and the second light sensor.

6. The optical position sensor of claim 3, wherein the slot in the slotted device is an Archimedes spiral.

7. The optical position sensor of claim 1, wherein the load is moved radially by the servo, and wherein the slotted device is directly coupled to the load.

8. The optical position sensor of claim 1, wherein the load is moved linearly by the servo, and the optical position sensor further comprises a radial motion converter coupled between the load and the slotted device, the radial motion converter configured to convert linear motion into radial motion.

9. The optical position sensor of claim 1, wherein the first light sensor and the second light sensor comprise phototransistors.

10. The optical position sensor of claim 9, wherein the light source is a light emitting diode with an emission wavelength matching a response of the first light sensor and the second light sensor.

11. The optical position sensor of claim 1, wherein the variable portion is a first portion of the first light sensor for a first position of the slotted device, a second portion of the second light sensor for a second position of the slotted device, and a third position of both the first and the second light sensors for a third position of the slotted device.

12. An optical position sensor for a servo moving a load comprising:
  a light source configured to produce a light with an intensity dependent upon a control signal;
  a first light sensor and a second light sensor positioned adjacent to one another, each light sensor configured to produce a current based upon an amount of light incident upon a light detector in each light sensor; and
  a slotted device coupled to the load and positioned between the light source and the first light sensor and the second light sensor, the slotted device configured to regulate
    an amount of light produced by the light source that strikes the first light sensor and the second light sensor based upon a position of the load, and
    a position where light from the light source strikes the first light sensor and the second light sensor,
  wherein the slotted device regulates the light via a slot in the slotted device,
  wherein the slot radius varies linearly with a rotation of the slotted device, and
  wherein as the load moves through a full range of motion, the position where the light from the light source strikes the first light sensor and the second light sensor pans across the first light sensor and the second light sensor.

13. The optical position sensor of claim 12, wherein a width of the slot in the slotted device remains constant for an entire length of the slot.

14. The optical position sensor of claim 12, wherein the slot in the slotted device is an Archimedes spiral.

15. The optical position sensor of claim 12, wherein the load is moved radially by the servo, and wherein the slotted device is directly coupled to the load.

16. The optical position sensor of claim 12, wherein the load is moved linearly by the servo, and the optical position sensor further comprises a radial motion converter coupled between the load and the slotted device, the radial motion converter configured to convert linear motion into radial motion.

* * * * *